UNITED STATES PATENT OFFICE.

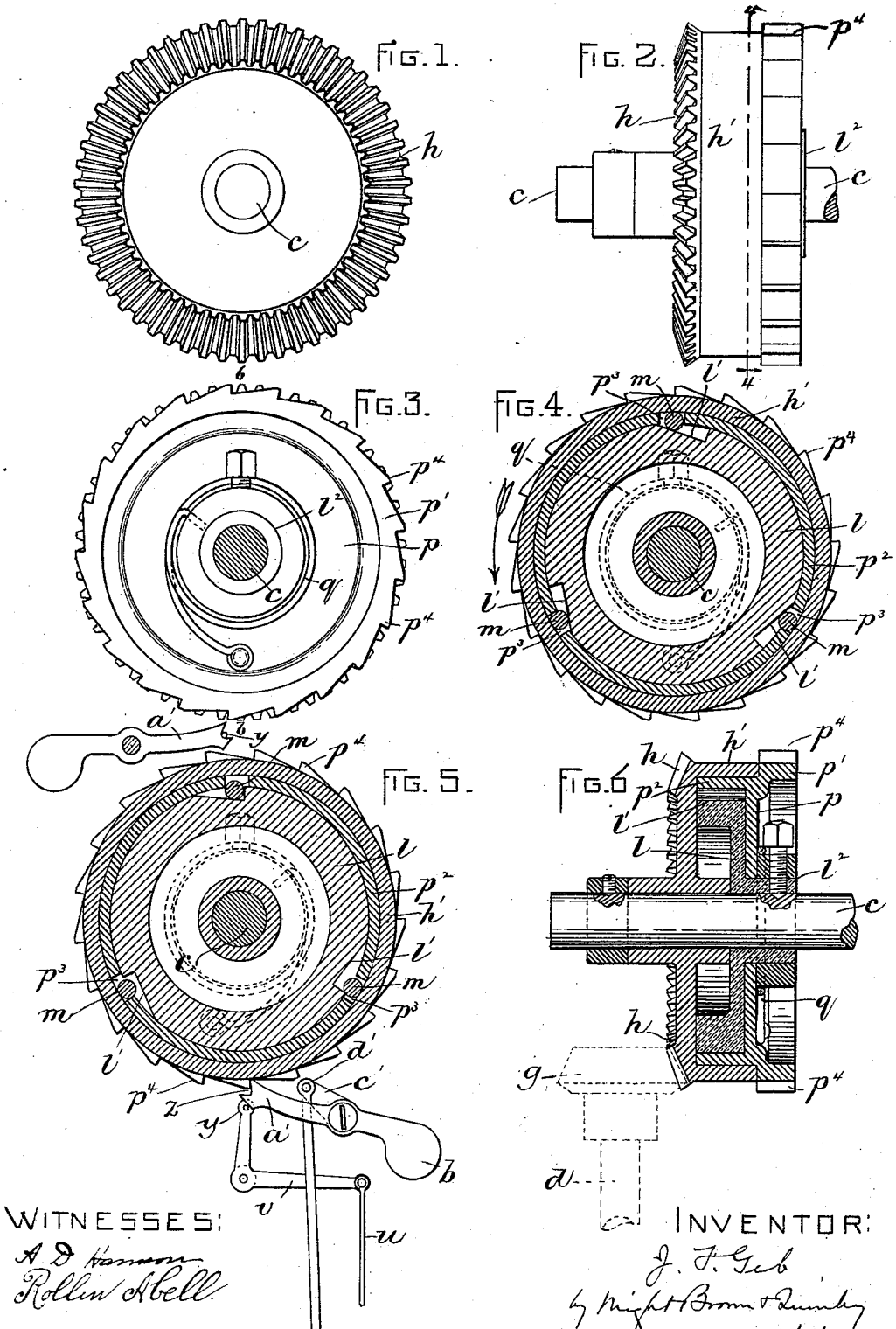

JACOB F. GEB, OF FRANKLIN, MASSACHUSETTS.

FEEDER FOR CARDING-ENGINES.

SPECIFICATION forming part of Letters Patent No. 554,486, dated February 11, 1896.

Application filed October 29, 1894. Serial No. 527,111. (No model.)

*To all whom it may concern:*

Be it known that I, JACOB FRANK GEB, of Franklin, in the county of Norfolk and State of Massachusetts, have invented certain new and useful Improvements in Feeders for Carding-Engines, of which the following is a specification.

This invention is intended chiefly as an improvement on the mechanism shown and described in Letters Patent of the United States granted to me February 16, 1892, No. 469,206, for disconnecting the apron-shaft of the Bramwell feeder from its driving mechanism when the scale of the feeder is depressed to discharge its load of wool, and connecting said shaft with the driving mechanism when the scale is raised to receive a fresh charge.

It is the object of the invention to provide more simple, durable, and effective mechanism for the purpose above mentioned; and to this end the invention consists in the improvements which I will now proceed to describe and claim.

Of the accompanying drawings, forming a part of this specification, Figure 1 represents an end elevation of my improved mechanism. Fig. 2 represents a side view of the same. Fig. 3 represents an elevation of the opposite end from that shown in Fig. 1. Fig. 4 represents a section on line 4 4 of Fig. 2, showing the shaft engaged with the loose gear of the driving mechanism. Fig. 5 represents a similar section showing the shaft disengaged. Fig. 6 represents a section on line 6 6 of Fig. 3.

The same letters or reference indicate the same parts in all the figures.

In the drawings, $c$ represents the shaft which impels the toothed apron of the Bramwell feeder.

$h$ represents a bevel-gear, which is loose upon said shaft, and is provided with an annular flange $h'$. Said gear $h$ is continuously rotated, as in my former patent, by power communicated from the driving-shaft (not shown) through a vertical shaft $d$, (see dotted lines in Fig. 6,) geared at its lower end to the driving-shaft and having at its upper end a bevel-gear $g$ meshing with the gear $h$.

$l$ represents a disk, which is affixed to or fast on the shaft $c$, and provided in its periphery with recesses, the longer sides or faces $l'$ of which form the inner sides of tapering cavities containing rolls or balls $m$, the outer sides of said cavities being the inner surface of the annular flange $h'$. The rolls $m$ are of hardened steel, and are of such diameter that when they are at the narrower ends of the said cavities they are in contact with both sides thereof and are caused by the motion of the flange $h'$, which is constantly rotating in the direction indicated by the arrow in Fig. 4, to lock the said flange and the disk $l$ together, and thus communicate motion to the shaft $c$, but when said rolls are moved toward the wider ends of said cavities they release their hold and permit the rotation of the shaft to cease.

$p$ represents a disk, which is loosely mounted upon the hub $l^2$ of the disk $l$, and is provided with a flange $p^2$ having slots $p^3$ in which the rolls $m$ play loosely. The disk $p$ is also provided with a flange $p'$, on which are formed a series of ratchet-teeth $p^4$. The disk $p$ is connected with the hub of the disk $l$ by means of a spring $q$, one end of which is attached to the disk $p$ and the other end to said hub or to a collar affixed thereto. Said spring yieldingly holds the disk $p$ and its flange $p^2$ in position to cause said flange to press the rolls $m$ toward the narrower ends of the cavities in which they are located, as shown in Fig. 4, and thus lock the shaft $c$ to the gear $h$.

When the disk $p$ is arrested, as hereinafter described, its flange $p^2$ arrests the rolls $m$, so that the continued rotation of the gear $h$ and the shaft $c$ causes said rolls to leave the narrower ends of the cavities and thus disconnect the said gear and shaft. I employ means for automatically arresting the disk $p$ when the scale of the Bramwell feeder is depressed to discharge its load of wool and for automatically releasing said disk when the said scale returns to its receiving position. I prefer to employ means similar to those set forth in my former patent, to which reference may be had for a fuller description. Said means comprise, first, a weighted dog $a'$ which engages one of the ratchet-teeth $p^4$ by gravitation; secondly, an arm $c'$ which is provided with a stud $d'$ projecting over the dog $a'$ and is so connected with the scale of the feeder that after the latter has discharged its load the said arm will be depressed and remove the dog from the ratchet-teeth $p^4$, permitting the engagement of the shaft $c$ with the gear $h$, and, thirdly, a detent $y$ on a lever $v$ which is arranged to engage a notch $z$ in the dog $a'$ and hold the latter out of the path of the ratchet-teeth $p^4$, and is so connected with the scale of the feeder that when the latter is depressed by its load the detent will be disengaged from the dog, permitting the latter to engage a ratchet-tooth $p^4$ and thus arrest the disk $p$ and the series of rolls $m$, the shaft $c$ being thus disconnected from the gear $h$, as already described.

It will be observed that the series of rolls $m$, located in the tapering cavities between the flange of the loose gear and the periphery of the fast disk $l$, and the spring-pressed disk $p$ controlling said rolls and provided with numerous ratchet-teeth, constitute a very simple, durable, and effective means for co-operating with the automatically-operated dog $a'$ in stopping and starting the apron-shaft $c$, the rolls being instantly and positively engaged with and disengaged from the co-operating surfaces, while the ratchet-teeth present so many points to engage the dog that there is no possibility of the continuance of the rotation of the shaft after the depression of the scale.

It is obvious that balls may be used instead of the rolls $m$.

I do not in this application claim broadly the combination of the apron-shaft, a driven gear loose thereon and provided with a flange, a loose clutch within said flange, and clutch-operating mechanism whereby the clutch is normally held in engagement with the flange, said mechanism including a coupling-collar which is affixed to the shaft and connects the clutch therewith, a spring-pressed clutch-controlling collar which is loose on the shaft and is provided with external teeth adapted to be engaged by an arresting device, and means for arresting said controlling-collar, said combination being claimed by me in another application for Letters Patent of the United States, filed December 15, 1894, Serial No. 531,920. I elect in the present case to confine my claim to the specific combination set forth in the following claim.

I claim—

The combination of the apron-shaft, a disk fast thereon and provided with inclined faces such as $l'$, a gear loose on said shaft and provided with an annular flange inclosing said disk, loose rolls or balls interposed between said flange and the faces $l'$, a spring-pressed disk loose on said shaft and provided with means for engaging said rolls and with a series of teeth or projections, a dog adapted to normally engage said teeth, and automatic means controlled by the weight of the material being acted upon for alternately displacing and releasing said dog, substantially as and for the purpose specified.

In testimony whereof I have signed my name to this specification, in the presence of two subscribing witnesses, this 25th day of October, A. D. 1894.

JACOB F. GEB.

Witnesses:
  GORDON K. CROSBY,
  WILLIAM A. WYCKOFF.